(12) United States Patent
Eswaraiah

(10) Patent No.: US 7,447,531 B2
(45) Date of Patent: Nov. 4, 2008

(54) ACCESSORY FOR WIPING AN INTERNAL USER INTERFACE OF A CLOSABLE ELECTRONIC DEVICE

(75) Inventor: Amit Eswaraiah, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 88 days.

(21) Appl. No.: 11/256,796

(22) Filed: Oct. 24, 2005

(65) Prior Publication Data
US 2007/0090795 A1 Apr. 26, 2007

(51) Int. Cl.
*H04M 1/00* (2006.01)
(52) U.S. Cl. .............. 455/575.8; 379/449; 379/451; 379/452; 379/455; 455/575.1; 455/575.3; 455/575.6
(58) Field of Classification Search ............... 320/114; D3/215, 218; 455/575.1, 575.3, 575.6, 575.8; 379/451, 452, 449, 455
See application file for complete search history.

(56) References Cited

U.S. PATENT DOCUMENTS

| 3,056,698 | A | 10/1962 | Kleesattel et al. |
| 3,542,592 | A | 11/1970 | Zweig |
| 6,637,484 | B1 * | 10/2003 | Kraft .................. 150/112 |
| 6,680,264 | B2 | 1/2004 | Julemont |
| 7,098,813 | B1 * | 8/2006 | Hung et al. ............... 341/22 |
| 2001/0027834 | A1 * | 10/2001 | Southwick ................ 150/108 |
| 2005/0159063 | A1 | 7/2005 | Hill et al. |
| 2005/0161352 | A1 | 7/2005 | Huddleston |
| 2006/0172765 | A1 * | 8/2006 | Lev ....................... 455/550.1 |

FOREIGN PATENT DOCUMENTS

JP 2004-135816 A 5/2004

OTHER PUBLICATIONS

Crumpler Digits Sporty Guy 0.6, Buy.com, 2 pages.
Optipouch is an amazingly simple idea, http://www.optitouch.com, 2 pages.

* cited by examiner

*Primary Examiner*—Gary L Laxton
*Assistant Examiner*—Ramy Ramadan
(74) *Attorney, Agent, or Firm*—Hisashi D. Watanabe

(57) ABSTRACT

There is provided an accessory (300, 500) for a portable electronic device that conveniently wipes an internal user interface of the device. The accessory (300, 500), is configured for removable attachment to the portable electronic device. The portable electronic device has first and second housings (102, 104) that rotate or otherwise adjust relative to each other. In particular, the portable electronic device may be closed or opened by adjusting the position of the first and second housings (102, 104). The portable electronic device has an internal user interface (106-116) that is exposed in the open position (100) and hidden in the closed position (200). The accessory (300, 500) includes an inner wall 306, 508) capable of placement between the first and second housings (102, 104) while the device is closed.

3 Claims, 5 Drawing Sheets

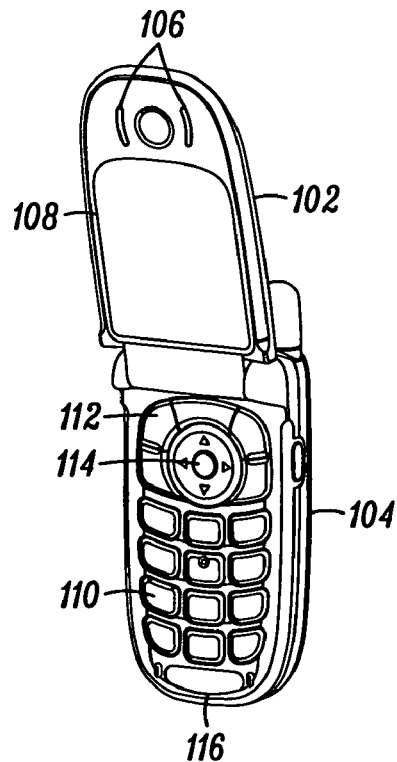
FIG. 1    100
(PRIOR ART)
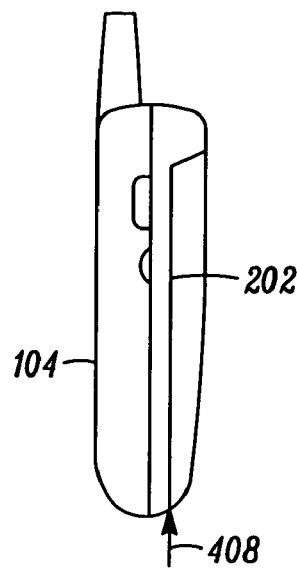
FIG. 2    200
(PRIOR ART)

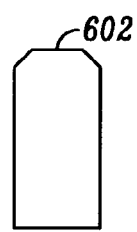 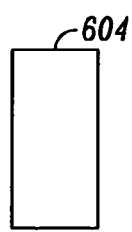 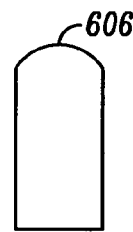
*FIG. 6A*   *FIG. 6B*   *FIG. 6C*
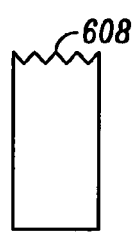 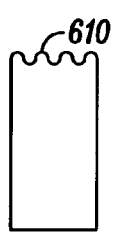 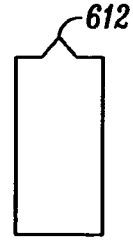
*FIG. 6D*   *FIG. 6E*   *FIG. 6F*
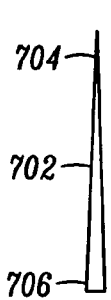 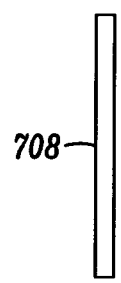  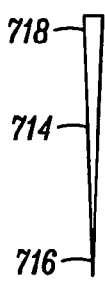
*FIG. 7A*   *FIG. 7B*   *FIG. 7C*   *FIG. 7D*

ACCESSORY FOR WIPING AN INTERNAL USER INTERFACE OF A CLOSABLE ELECTRONIC DEVICE

FIELD OF THE INVENTION

The present invention relates generally to the field of accessories for wiping a user interface of an electronic device for purposes of cleaning the surface of the user interface. In particular, the present invention relates to an accessory for wiping an internal user interface of a portable electronic device while the device is closed.

BACKGROUND OF THE INVENTION

Many electronic devices include a user interface that may require cleaning from time-to-time. For example, a simple cleaning of a display may improve visibility of its displayed content, and a simple cleaning of a keypad may improve the operation of the keys or the ability of a user to interact with the keys. A simple wipe of the user interface on a regular or periodic basis is very effective for improving the usability of the electronic device. For this reason, some users maintain disposable tissues or reusable clothes within proximity of electronic device to wipe the user interface on a regular basis.

Portable electronic devices are frequently transported from place-to-place, so it can be a nuisance to maintain tissues or clothes within proximity of portable electronic devices. Portable electronic devices include, but are not limited to, wireless communication devices, personal digital assistants, calculators, handheld gaming devices, audio players and recorders, video players and recorders, and the like. Cleaning tissues and/or clothes are not available everywhere a portable electronic device may travel, so the user of the portable electronic device would have the burden of carrying cleaning tissues and/or clothes along with the portable electronic device.

Cleaning surfaces have been integrated to with carrying cases of products in order to facilitate cleaning of the products. For example, sunglasses may be carried in a soft cloth, drawstring bag so that the sunglasses are protected and the bag may be used to clean the lenses of the sunglasses. As another example, a device pouch may have a soft lining to protect the device carried by the pouch.

Referring to FIGS. 1 and 2, certain types of portable electronic devices have collapsible form factor in which each device may be opened or closed. For example, the portable electronic device may have a first housing 102 that is adjustable, e.g., rotates, relative to a second housing 104 to form open and closed positions. These types of closable electronic devices often have an internal user interface that is exposed in a device's open position 100, as represented by FIG. 1, and concealed in the device's closed position 200, as represented by FIG. 2. The internal user interface may include, but is not limited to, an ear piece 106, a display 108, a numeric keypad 110, other types of keys 112, a navigation mechanism 114, and a mouth piece 116. In the closed position 200, the internal user interface is only accessible by separating the first and second housings 102, 104 at a plane of contact 202 where the first and second housing meet. Thus, tissues, clothes and cleaning surfaces of carrying cases are only able to clean the outer surface of a portable electronic device when the device is in its closed position 200. The internal user interface may only be cleaned or otherwise wiped using existing items when the portable electronic device is in its open position 100.

Accordingly, there is a need for an accessory for a portable electronic device having a closable form factor, in which the accessory is capable of wiping an internal user interface of the portable electronic device while the device is closed. There is a particular need for an accessory that is a capable of wiping the internal user interface with minimal maintenance or effort required by the user of the portable electronic device.

BRIEF DESCRIPTION OF THE DRAWINGS

FIG. 1 is a perspective view of a portable electronic device of the prior art in an open position.

FIG. 2 is a perspective view of the prior art portable electronic device of FIG. 1 in a closed position, although it should be noted that the arrow at the bottom of FIG. 2 should not be considered to be prior art.

FIGS. 6A through 6F are planar views of various embodiments of the inner wall and their front edges in accordance with the present invention.

FIGS. 7A through 7D are sectional views of various embodiments of the inner wall in accordance with the present invention.

DETAILED DESCRIPTION OF THE PREFERRED EMBODIMENTS

The present invention is directed to an accessory for a portable electronic device having open and closed positions, in which a user interface of the device is exposed for the open position and concealed for the closed position. The accessory is capable of cleaning the user interface while the device is in its closed position.

The portable electronic device of the type described above include, but are not limited to, wireless communication devices, portable computing devices, personal digital assistants, audio players and/or records, video players and/or recorders, portable gaming systems, and hybrids of one or more of these devices. Wireless communication devices utilize one or more types of wireless communication technologies. Examples of wireless communication technologies include, but are not limited to, analog communications (using AMPS), digital communications (using CDMA, TDMA, GSM, iDEN, GPRS, or EDGE), and next generation communications (using UMTS or WCDMA). Other examples of wireless communication technologies include, but are not limited to, peer-to-peer or ad hoc communications including HomeRF, Bluetooth, IEEE 802.11 (a, b or g), and IEEE 802.16 (a, d, or e).

One aspect of the present invention is an accessory for supporting a portable electronic device having open and closed positions, the portable electronic device having a user interface that is exposed in the open position and hidden in the closed position. The accessory comprises a base, an outer wall extending from the periphery of the base, and an inner wall surrounded by the outer wall. The inner wall has a substantially rigid construction and a cleansing material on at least one surface of the inner wall.

Another aspect of the present invention is a portable electronic system comprising a portable electronic device and an accessory configured for removable attachment to the portable electronic device. The portable electronic device has first and second housings that are adjustable relative to each other to form open and closed positions. The portable electronic device has a user interface that is exposed in the open position and hidden in the closed position. The accessory includes an inner wall having a substantially rigid construction and capable of placement between the first and second housings while the housing form the closed position.

Figure 3:
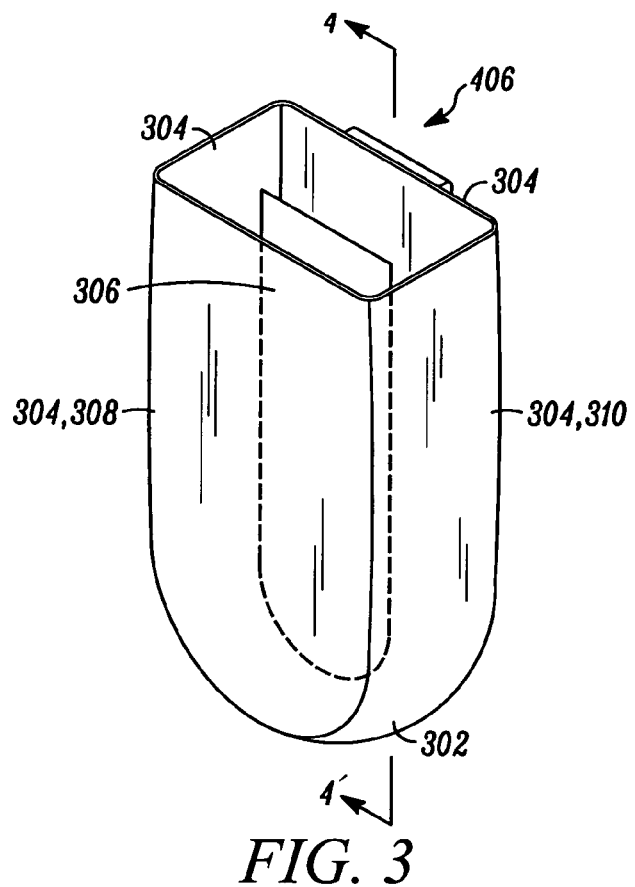
FIG. 3 is a perspective view of an embodiment in accordance with the present invention.

Referring to FIG. 3, there is shown an embodiment in accordance with the present invention. For this embodiment, an accessory 300 is used to support a portable electronic device (shown in FIGS. 1 and 2) having open and closed positions, and including a user interface that is exposed in the open position and hidden in the closed position. The accessory 300 includes a base 302, an outer wall 304 extending from the periphery of the base, and an inner wall 306 surrounded by the outer wall. The inner wall 306 has a substantially rigid construction and cleansing material on one or more surfaces of the inner wall.

The cleansing material has a composition that is conducive to cleaning user interfaces. For example, the cleansing material may be a fibrous, anti-static, anti-dust and/or microfiber fabric or composition. In addition, the fabric or composition may be impregnated with a cleansing chemical, such as an oil-free, wax-free and/or ammonia-free chemical. Examples of the cleansing chemical include, but are not limited to, a composition of alkanol (ether/ethanol/isopropyl alcohol etc), anionic/cationic surfactants (alkyl ether sulfate surfactant), odor control agent (cyclodextrin), hydrophilic polymers, and/or solvents. The types of user interface components that may be cleaned by the cleansing material include, but are not limited to, ear pieces, displays, numeric keypads, other types of keys, navigation mechanisms, and mouth pieces. The inner wall 306 may be supported by the base 302 or by opposing lateral sides 308, 310 of the outer wall.

The outer wall 304 may include an inner surface having some type of cleansing material as described above. Cleansing material at the inner surface of the outer wall 304 may be particularly useful for portable electronic device 300 having user interface component on the outside of its housings 102, 104, i.e., exposed when the device is in its closed position 200. For example, a wireless communication device may have a keypad, selection buttons and/or a second display on the outside of the device housing. For such devices, the cleansing material of the outerwall 304 may be effective to clean these user interface components while the device is being inserted or removed from the accessory 300.

Figure 4:
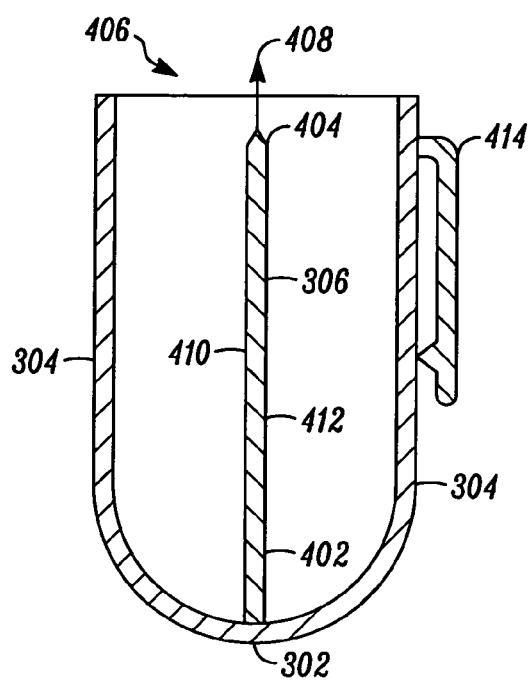
FIG. 4 is a sectional view of the embodiment of FIG. 3 as represented by line 4-4' of FIG. 3.

FIG. 4 is a sectional view of the embodiment of FIG. 3. For this embodiment, the inner wall 306 is a diaphragm or divider positioned within a slot of the accessory 300 bounded by the inner surfaces of the outer wall 304. As stated above, the inner wall 306 may be supported by the base 302, as shown in FIG. 4, and/or by opposing lateral sides 308,310 of the outer wall. Although the inner wall 306 is shown equidistant from the outer wall 304 on either side of the inner wall, it is to be understood that the particular location of the inner wall 306 may depend on the location of the plane of contact (202 in FIG. 2) of the portable electronic device 300, defined by the meeting area of the first and second housing 102, 104.

It is important to note that the inner wall 306 of the accessory has a lower end 402 that may be adjacent or, in the alternative, attached to the base 302, and an upper end 404 that is directed toward an insertion area 406 of the accessory 300, away from the base. The insertion area 406 of the accessory 300 is an open area of the accessory where the portable electronic device may be inserted. As represented by arrow 408, the upper end 404 is inserted between the housings 102, 104, of the portable electronic device as the device is inserted through the insertion area 406 into the accessory or, more particularly, the inner part of the accessory bounded by the outer wall 304. As the upper end 404 is inserted between the housings 102, 104, the inner wall 306 progresses into the device 300 between the housings, thus gaining access to the internal user interface of the device. By sliding past one or more components of the internal user interface, the cleansing material on one or both surfaces 410, 412 of the inner wall 306 effective wipes the components to clean them.

Regarding back to FIG. 2, it should be noted that the arrow 408 at the bottom of the portable electronic device has be duplicated from FIG. 4 to illustrate the insertion and wiping function of the present invention and should not be considered to be prior art. As the portable electronic device is inserted into the accessory 300, the upper end 404 of the inner wall 306 is inserted between the housings 102, 104 at the plane of contact 202, as represented by arrow 408.

Referring again to FIG. 4, the inner wall 306 is positioned in such a way that, whenever a user slips the portable electronic device into the accessory 300, the inner wall 306 slides in between the housings 102, 104 of the device. This cleaning and/or disinfecting action may occur when the portable electronic device slides into the accessory or slides out of the accessory.

For this embodiment, the accessory 300 may be supported to a user by a wide variety of support mechanisms 414. For example, the accessory 300 may have a belt loop or belt clip for support at a user's waist line, a strap for support at a user's arm or shoulder, a lanyard for support below a user's neck, or a fastening strip for attachment to another surface or a corresponding fastening strip. Also, the accessory 300 may include a belt-supporting mechanism 414 provided at the outer surface of the outer wall 304, in which the belt-supporting mechanism is capable of coupling to a user's belt. For the embodiment shown in FIG. 5, the accessory includes a belt clip that may pivot relative to the accessory so that the belt clip may be hooked-over the user's belt.

Figure 5:
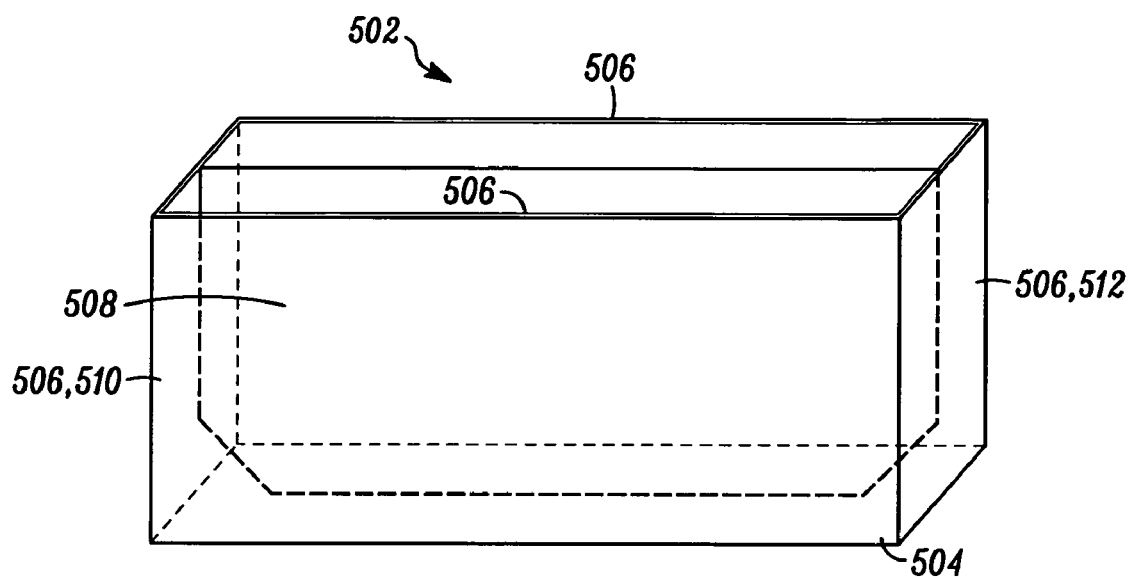
FIG. 5 is a perspective view of another embodiment in accordance with the present invention.

FIG. 5 shows another embodiment in accordance with the present invention. In contrast to the vertically elongated embodiment illustrated by FIG. 3, where the insertion area 406 is provided at a narrower end of the accessory 300, FIG. 5 illustrates a horizontally elongated embodiment where the insertion area 502 is provided at a wider end of the accessory 500. This embodiment may receive portable electronic devices having a wide form factor, in contrast to the embodiment represented by FIG. 3 which may receive devices having a tall form factor. Examples of portable electronic devices that may have wide form factors include, but are not limited, devices having full QWERTY keyboards and/or wide-screen displays. It should be noted, however, that the embodiment shown in FIG. 5 may also accommodate devices having the tall form factor if the device is inserted into the accessory 500 sideways. A user may find that sideway insertion is preferable and, in fact, may be necessary for portable electronic devices having particular form factors that not conducive to insertion of the inner wall 306 between its housings for the embodiment shown in FIG. 3.

For the embodiment of FIG. 5, the accessory 500 includes a base 504, an outer wall 506 extending from the periphery of the base, and an inner wall 508 surrounded by the outer wall. Similar to other embodiments described above, the inner wall 508 has a substantially rigid construction and cleansing material on one or more surfaces of the inner wall. The inner wall 508 may be supported by the base 504 and/or by opposing lateral sides 510, 512 of the outer wall 506.

FIGS. 6A through 6F show various embodiments of the inner wall, for example 306 & 508, and their front edges in accordance with the present invention. FIG. 6A shows an inner wall having a front edge 602 with beveled sides; FIG. 6B shows an inner wall having a front edge 604 having a linear form; FIG. 6C shows an inner wall having a front edge 606 having a curved form; FIG. 6D shows an inner wall having a front edge 608 having a zig-zag form; FIG. 6E shows an inner wall having a front edge 610 having a wavy form; and FIG. 6F shows an inner wall having a front edge 612 with a pointed-peak near the center of the edge. It is to be understood that the embodiments shown in FIGS. 6A through 6F are presented as examples, and the present invention is not restricted to these particular representations.

FIGS. 7A through 7D show various embodiments of the inner wall, for example 306 & 508, in accordance with the present invention. FIG. 7A shows an inner wall 702 having an angled profile, in particular a tapered form in which a pointed edge 704 is directed away from the base 302, 504 of the portable electronic device 300, 500, and the opposite end 706 is wider than the tapered end and directed toward the base; FIG. 7B shows an inner wall 708 having an even profile, in particular a substantially constant, linear form along its entire length; FIG. 7C shows an inner wall 710 having an uneven profile, in particular a wavy form in which one end of the inner wall may be tapered 712; and FIG. 7D shows an inner wall 714 having an angled profile, in particular a tapered form in which a pointed edge 716 is directed toward the base 302, 504 of the portable electronic device 300, 500, and the opposite end 718 is wider than the tapered end and directed away from the base. It is to be understood that the embodiments shown in FIGS. 7A through 7D are presented as examples, and the present invention is not restricted to these particular representations.

Figure 8A:
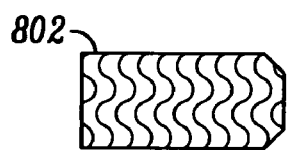
FIG. 8A through 8E are planar views of various embodiments of the inner wall and their surface textures in accordance with the present invention.
Figure 8B:
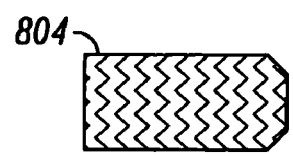
Figure 8C:
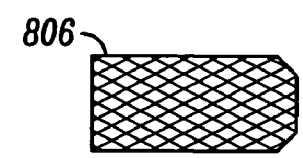
Figure 8D:
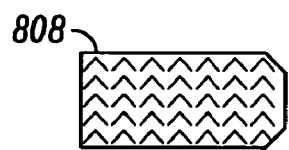
Figure 8E:
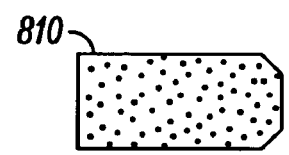

FIG. 8A through 8E show various embodiments of the inner wall, for example 306 & 508, and their surface textures in accordance with the present invention. The cleansing material may be distributed at one or more surfaces, or one or more portions of each surface, of the inner wall to form a particular pattern. FIG. 8A shows an inner wall 802 having a wavy pattern; FIG. 8B shows an inner wall 804 having a zig-zag pattern; FIG. 8C shows an inner wall 806 having a criss-cross pattern; FIG. 8D shows an inner wall 808 having a protruding pattern in which each protrusion is spaced equidistant from each other; and FIG. 8E shows an inner wall 810 having a random pattern distributed on the surface of the inner wall. It is to be understood that the embodiments shown in FIGS. 8A through 8E are presented as examples, and the present invention is not restricted to these particular representations.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims

What is claimed is:

1. A portable electronic system comprising:
a portable electronic device having first and second housings that are adjustable relative to each other to form open and closed positions, the portable electronic device having a user interface that is exposed in the open position and hidden in the closed position; and
an accessory configured for removable attachment to the portable electronic device, the accessory including:
an outer wall;
an inner wall surrounded by the outer wall, the inner wall having a rigid construction to slide between the first and second housings while the portable electronic device is placed in the accessory,
wherein the inner wall has a cleaning material having a microfiber composition on at least one surface of the inner wall, wherein the outer wall includes an inner surface having the cleaning material.

2. The portable electronic system of claim 1, further comprising a belt-supporting mechanism provided at an outer surface of the outer wall, the belt-supporting mechanism being capable of coupling to a belt.

3. The portable electronic system of claim 1, wherein the inner wall is equidistant from the outer wall on either side of the inner wall.

* * * * *